(12) United States Patent
Benkreira et al.

(10) Patent No.: US 10,789,349 B2
(45) Date of Patent: *Sep. 29, 2020

(54) SYSTEMS AND METHODS FOR SAFELY STORING AN OBJECT

(71) Applicant: Capital One Services, LLC, McLean, VA (US)

(72) Inventors: Abdelkader M'Hamed Benkreira, Washington, DC (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/420,267

(22) Filed: May 23, 2019

(65) Prior Publication Data

US 2020/0159901 A1    May 21, 2020

Related U.S. Application Data

(63) Continuation of application No. 16/198,411, filed on Nov. 21, 2018, now Pat. No. 10,354,058.

(51) Int. Cl.
  *G06F 21/34* (2013.01)
  *G06K 7/14* (2006.01)
  *G06K 7/08* (2006.01)

(52) U.S. Cl.
  CPC ............. *G06F 21/34* (2013.01); *G06K 7/087* (2013.01); *G06K 7/1417* (2013.01)

(58) Field of Classification Search
  CPC ....... G06F 21/34; G06K 7/087; G06K 7/1417
  See application file for complete search history.

(56) References Cited

U.S. PATENT DOCUMENTS

| | | | |
|---|---|---|---|
| 3,685,690 A | | 8/1972 | Karecki |
| 4,010,824 A | * | 3/1977 | Bavis ..................... E04H 14/00 186/37 |

(Continued)

FOREIGN PATENT DOCUMENTS

| WO | 2008/136031 A1 | 11/2008 |
|---|---|---|
| WO | 2013/156956 A1 | 10/2013 |

OTHER PUBLICATIONS

Haupt et al., Architecture for a Secure Distributed Repository, Sep. 2006, 7th IEEE/ACM International Conference on Grid Computing, pp. 200-206 (Year: 2006).*

(Continued)

*Primary Examiner* — Kenneth W Chang
(74) *Attorney, Agent, or Firm* — Greenberg Traurig, LLP (57) ABSTRACT

A system for storing an object includes a card reader configured to receive a card from a user and to determine an identity of the user based on information on the card. The system also includes a secure storage area configured to store a plurality of physical boxes. The plurality of physical boxes includes a first physical box that is assigned to the user. The first physical box is configured to be dispensed from the secure storage area to the user outside of the secure storage area in response to the user requesting to physically receive the first physical box. Dispensing the first physical box includes moving the first physical box along a predetermined path in the secure storage area and presenting the first physical box for removal from the secure storage area.

20 Claims, 4 Drawing Sheets

(56) References Cited

U.S. PATENT DOCUMENTS

| | | | | |
|---|---|---|---|---|
| 4,789,293 A * | 12/1988 | Hashimoto | ............ | B65G 1/1371 |
| | | | | 186/37 |
| 4,792,270 A | 12/1988 | Yoshida | | |
| 5,475,376 A | 12/1995 | Chikamitue et al. | | |
| 6,490,893 B1 * | 12/2002 | Benion | ................... | A45C 1/06 |
| | | | | 109/45 |
| 6,502,746 B1 * | 1/2003 | Do | .................... | G06Q 20/1085 |
| | | | | 235/375 |
| 6,554,105 B2 * | 4/2003 | Brown | ................ | B65G 17/123 |
| | | | | 186/41 |
| 6,990,588 B1 | 1/2006 | Yasukura | | |
| 8,260,692 B1 | 9/2012 | Miller | | |
| 9,235,740 B1 | 1/2016 | Graybill | | |
| 9,794,253 B2 * | 10/2017 | Narayan | ............. | H04L 63/0846 |
| 9,846,763 B2 | 12/2017 | Hyde et al. | | |
| 9,908,703 B2 | 3/2018 | Andrews et al. | | |
| 2004/0243812 A1 * | 12/2004 | Yui | ................... | G07C 9/00896 |
| | | | | 713/182 |
| 2005/0264400 A1 * | 12/2005 | Fisher | ..................... | G07C 9/27 |
| | | | | 340/5.73 |
| 2005/0269404 A1 * | 12/2005 | Landwirth | ......... | G07C 9/00912 |
| | | | | 235/382 |
| 2006/0293784 A1 * | 12/2006 | Braunstein | ............ | G07F 11/002 |
| | | | | 700/231 |
| 2011/0035598 A1 | 2/2011 | Pizano | | |
| 2012/0310410 A1 | 12/2012 | Adams | | |
| 2017/0124792 A1 | 5/2017 | Schoenfelder | | |
| 2017/0297819 A1 | 10/2017 | Andrews et al. | | |

OTHER PUBLICATIONS

European Search Report from European Patent Application No. 19210657.3 dated Mar. 24, 2020.

* cited by examiner

SYSTEMS AND METHODS FOR SAFELY STORING AN OBJECT

CROSS-REFERENCE TO RELATED APPLICATIONS

This application is a continuation of U.S. patent application Ser. No. 16/198,411, which was filed on Nov. 21, 2018, the entirety of which is incorporated by reference.

BACKGROUND

Several options exist for a user to store an object outside of the user's premises. For example, the user may want to store a spare key outside of the user's premises in the event that the user loses his/her primary key. In another example, the user may want to store a spare key outside of the user's premises in the event that the user wants to grant a third party access to the spare key, but the user is not available to give the spare key to the third party in person.

One option is to store the object under a rock, plant, rug, etc. However, as will be appreciated, this is not a secure option. Another option is to store the object with a friend/neighbor. However, the friend/neighbor may not be available when the user needs the object back. Another option is to store the object in a safety deposit box. However, accessing an object in a safety deposit box may take an inordinate amount of time and be restricted to the business hours of a bank, among other drawbacks. Therefore, what is needed is an improved system and method for safely storing an object.

SUMMARY

A system for storing an object is disclosed. The system includes a card reader configured to receive a card from a user and to determine an identity of the user based on information on the card. The system also includes a secure storage area configured to store a plurality of physical boxes. The plurality of physical boxes includes a first physical box that is assigned to the user. The first physical box is configured to be dispensed from the secure storage area to the user outside of the secure storage area in response to the user requesting to physically receive the first physical box. Dispensing the first physical box includes moving the first physical box along a predetermined path in the secure storage area and presenting the first physical box for removal from the secure storage area. The first physical box defines an internal volume that is configured to store one or more physical objects. The first physical box is configured to be returned to the secure storage area after the user adds the one or more physical objects to, or removes the one or more physical objects from, the internal volume of the first physical box.

A method for storing an object is also disclosed. The method includes providing a map to a user showing a plurality of secure storage areas at a plurality of geographic locations. The map indicates which of the secure storage areas have available physical boxes. The method also includes receiving a request from the user to have a physical box assigned to the user. The physical box is one of the available physical boxes at one of the secure storage areas. The method also includes assigning the physical box to the user in response to the request to have the physical box assigned to the user. The method also includes receiving a request from the user to physically receive the physical box. The method also includes automatically dispensing the physical box to the user outside of the secure storage area in response to the request to physically receive the physical box. Dispensing the physical box includes moving the physical box along a predetermined path in the secure storage area and presenting the physical box for removal from the secure storage area. The physical box defines an internal volume that is configured to store one or more physical objects. The method also includes receiving the physical box from the user after the user adds the one or more physical objects to, or removes the one or more physical objects from, the internal volume of the physical box. The physical box is received into the secure storage area.

Another method for storing an object is also disclosed. The method includes receiving a request from a first user to authorize a second user to access a physical box. The physical box is one of a plurality of physical boxes that are located in a secure storage area. The method also includes receiving a request from the second user to physically receive the physical box. The method also includes automatically dispensing the physical box to the second user in response to the request to physically receive the physical box. Dispensing the physical box includes moving the physical box along a predetermined path using a belt and presenting the physical box for detachment from the belt. The box defines an internal volume that is configured to store one or more physical objects. The method also includes receiving the physical box from the second user after the second user adds the one or more physical objects to, or removes the one or more physical objects from, the internal volume of the physical box.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Figure 1:
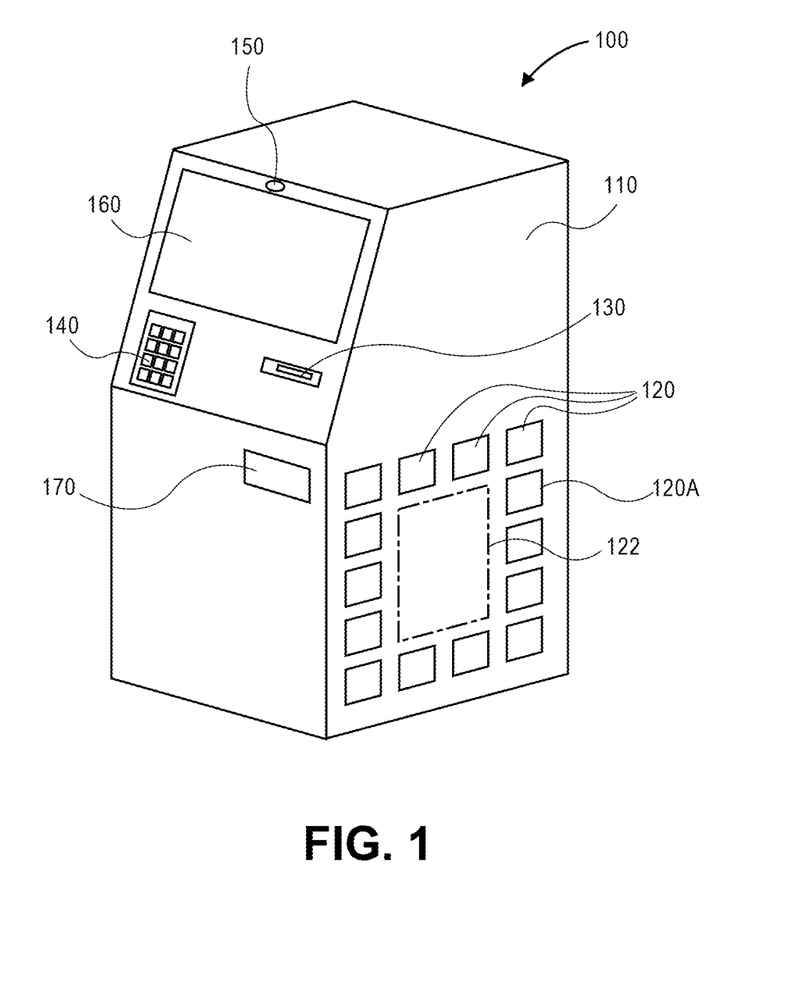
FIG. 1 is a diagram illustrating an example of a system for storing an object, consistent with certain disclosed embodiments.

FIG. 1 is a diagram illustrating an example of a system 100 for storing an object, consistent with certain disclosed embodiments. The system 100 may be or include an automated teller machine (ATM) or a modified version thereof.

Thus, the system 100 may include a body 110 that defines an internal volume. In various implementations, the body 110 may be made of a strong material, such as steel or the like. The internal volume may be a secure storage area that may only be accessed by authorized personnel.

A plurality of boxes 120 may be stored in the internal volume of the body 110. As shown, a wall of the body has been removed (or is shown as being transparent) so that the ends of the boxes 120 in the internal volume may be seen. The boxes 120 may each have a length from about 6 cm to about 10 cm, a width from about 9 cm to about 22 cm, and a height from about 2 cm to about 5 cm. The boxes 120 may each define an internal volume that is configured to store one or more objects. The object(s) may belong to the user or to another person that has been granted access to the user's box by the user. Thus, the object(s) may not belong to or be a part of the system 100. The object(s) may be or include a key, paper (e.g., a contract), jewelry, a data storage device (e.g., a flash drive), or the like. As will be appreciated, this list is merely exemplary and is not intended to be limiting.

Each of the boxes 120 may have an identifier (e.g., on an outer surface thereof). The identifier may be or include a barcode, a radio frequency identification (RFID) tag, a text label, or the like that may be read (e.g., scanned) and used to identify the particular box.

The boxes 120 may be detachably coupled to a belt 122 within the internal volume of the body 110. The belt 122 may move along a predetermined path (e.g., in a loop), and may thus move the attached boxes 120, to facilitate dispensing, receiving, and/or storing the boxes 120.

The body 110 may also include a card reader 130 configured to receive and read a card (e.g., a credit card, a debit card, a driver's license card, an ATM card, etc.) belonging to the user. The information on the card may be used identify the user and/or to identify a user account that is linked to the user.

The body 110 may also include a keypad 140 configured to receive manual input from the user. The manual input may be or include authentication information (e.g., a password or key code). The authentication information may be used to authenticate the identity of the user and/or to confirm that the user is linked to the user account.

The body 110 may also or instead include a camera 150 configured to capture a picture or image of the user. The picture may also or instead be used to authenticate the identity of the user and/or to confirm that the user is linked to the user account.

The body 110 may also include a display screen 160 configured to display information to the user. The body 110 may also include an actuator 170 configured to automatically dispense or move the user's box 120 from the internal volume to the user, and to subsequently receive the user's box 120A from the user. In at least one embodiment, the user's box 120A may be detachable from the belt 122 when it is dispensed such that the user may walk away with the box 120A. In another embodiment, the user's box 120A may remain attached to the belt 122 when dispensed such that the user may not walk away with the box 120A.

Figure 2:
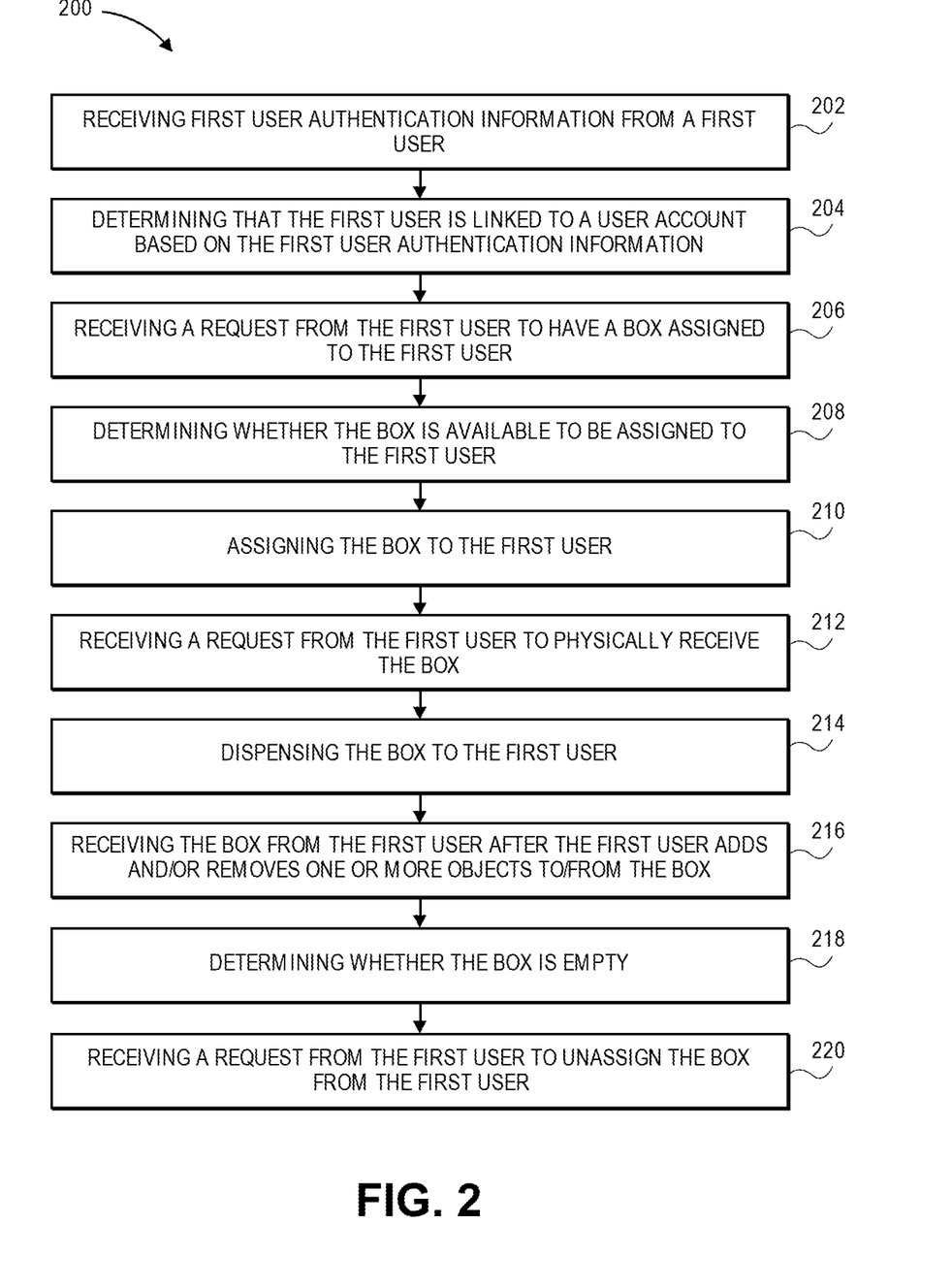
FIG. 2 is a diagram illustrating an example of a flowchart of a method for storing an object.

FIG. 2 is a diagram illustrating an example of a flowchart of a method 200 for storing an object. The method 200 is from the perspective of the system 100, such as an ATM, as opposed to the perspective of the user. The steps of the method 200 are provided in an exemplary order below; however, the steps may be performed in a different order as well. The method 200 may include receiving first user authentication information from a first user, as at 202. The first user may submit the first user authentication information remotely or in person.

To submit the first user authentication information remotely, the first user may use a personal device, such as personal computer, a smart phone, a tablet, etc. that is in (e.g., wireless) communication with the system 100. When submitting the first user authentication information remotely, the first user authentication information may be or include a username, an account number, and/or a password.

To submit the first user authentication information in person, the first user may interact directly (e.g., manually) with the system 100, similar to using a conventional ATM. When submitting the first user authentication information in person, the first user may enter a card into the card reader 130. The card may be or include an ATM card, a credit card, a debit card, a driver's license card, etc. belonging to the first user. In at least one embodiment, the first user may also enter a password (e.g., a personal identification number (PIN number)) into the keypad 140. In another embodiment, the camera 150 may capture a picture of the first user to use as authentication information.

The method 200 may also include determining that the first user is linked to a user account, (such as a bank account, a credit card account, a box usage account, or the like), based on the first user authentication information, as at 204. This may include comparing the first user authentication information to corresponding authentication information associated with the user account. For example, the username, account number, and/or PIN or password submitted by the first user may be compared to a corresponding username, account number, and/or PIN or password associated with the user account, and if they match, the system 100 decides or determines that the first user is linked to the user account. In another example, the information on the card, the password (e.g., PIN number), and/or the picture may be compared to corresponding card information, a password, and/or a picture associated with the user account, and if they match, the first user is determined to be linked to the user account. If the user does not have a user account, the user may be presented with the option to create a new account with which the first user is linked.

After the first user is determined to be linked to the user account, the method 200 may also include receiving a request from the first user to have a box 120A assigned to the first user, as at 206. In various implementations, the request at 206 may come before or after the receiving at 202 and/or the determining at 204. The first user may submit the request remotely or in person. If the request is submitted remotely, the user may submit the request for a particular system 100 at a particular geographic location (e.g., an ATM close to the user's home or office). The method 200 may also include determining whether the box 120A is available in the system 100 to be assigned to the first user, as at 208. This may include determining that at least one of the boxes 120 is currently unassigned. For example, the system 100 may keep an electronic record locally of which boxes 120 are free/assigned. In another example, the electronic record may be kept at a central server. In another example, something may physically change in the boxes 120 when used (e.g., a mechanical or electrical switch or indicator), so that the system 100 can tell from the boxes 120 whether or not they are assigned.

If the box 120A is available to be assigned, the method 200 may also include assigning the box 120A to the first user, as at 210. This may include linking the identifier on the box 120A to the user account. Once assigned, the user may pay for the rental of the box 120A (e.g., by the hour or by the day). In some embodiments, the rental fee may be paid from the user account that the first user is linked to, such as from bank account or a credit card account. If no boxes 120 are available to be assigned at the particular system 100, the user may be prompted to select a different system 100 at a different geographic location. In at least one embodiment, the user may be able to view a map of all systems 100 at various geographic locations (e.g., on the display screen 160 or on the user's remote device), and the map may show which systems have available boxes and which do not.

After the box 120A is assigned to the first user, the method 200 may also include receiving a request from the first user to physically receive the box 120A, as at 212. In various implementations, the first user may only submit this request in person (i.e., not remotely). If the first user authentication information was submitted remotely at 202, then the first user may have to resubmit the authentication information in person (e.g., at the system 100) in order to request to physically receive the box 120A. In response to the request, the method 200 may also include automatically dispensing the box 120A (from the system 100) to the first user, as at 214. Automatically dispensing the box 120A may be in contrast to a person (e.g., the first user or a bank teller) manually retrieving the box (e.g., like a safe deposit box). To dispense the box 120A, the belt 122 may move along the predetermined path, carrying the box 120A with it. When the box 120A is aligned with the actuator 170, the actuator 170 may engage the box 120A and subsequently dispense the box 120A to the first user. As described above, in one example, the box 120A may remain coupled to the belt 122 when dispensed. In another example, the box 120A may be decoupled form the belt 122 when dispensed.

After the box 120A is dispensed to the first user, the first user may open the box 120A and add one or more objects to the box 120A (e.g., the user may place an object into the box 120A) and/or remove one or more objects from the box 120A. The objects may belong to or be in the possession of the first user, (i.e., the objects do not belong to, or are not a part of, the system 100). The method 200 may also include receiving the box 120A from the first user after the first user adds and/or removes the one or more objects to/from the internal volume of the box 120A, as at 216. More particularly, the first user may return the box 120A to the actuator 170, which may engage the box 120A and subsequently transfer the box 120A to its spot on the belt 122. In at least one embodiment, when the box 120A is detachable from the belt 122, the first user may keep the box 120A, or take the box 120A with him/her, for a predetermined amount of time prior to returning the box 120A. However, the user may then need to re-authenticate himself/herself when the user returns.

In at least one embodiment, after the box 120A is received, the method 200 may include determining whether the box 120A is empty, as at 218. This may include weighing the box 120A and comparing the weight to the known weight of an empty box. If the box 120A is determined to be empty, the first user may be asked (e.g., via a message on a user interface shown the display screen 160) if he/she wants to continue renting the box 120A or to stop renting the box 120A. Thus, if the box 120A is determined to be empty, the method 200 may also include receiving a request from the first user to unassign the box 120A from the first user, as at 220. This may include changing the electronic record that associates the box 120A with the user account.

Figure 3:
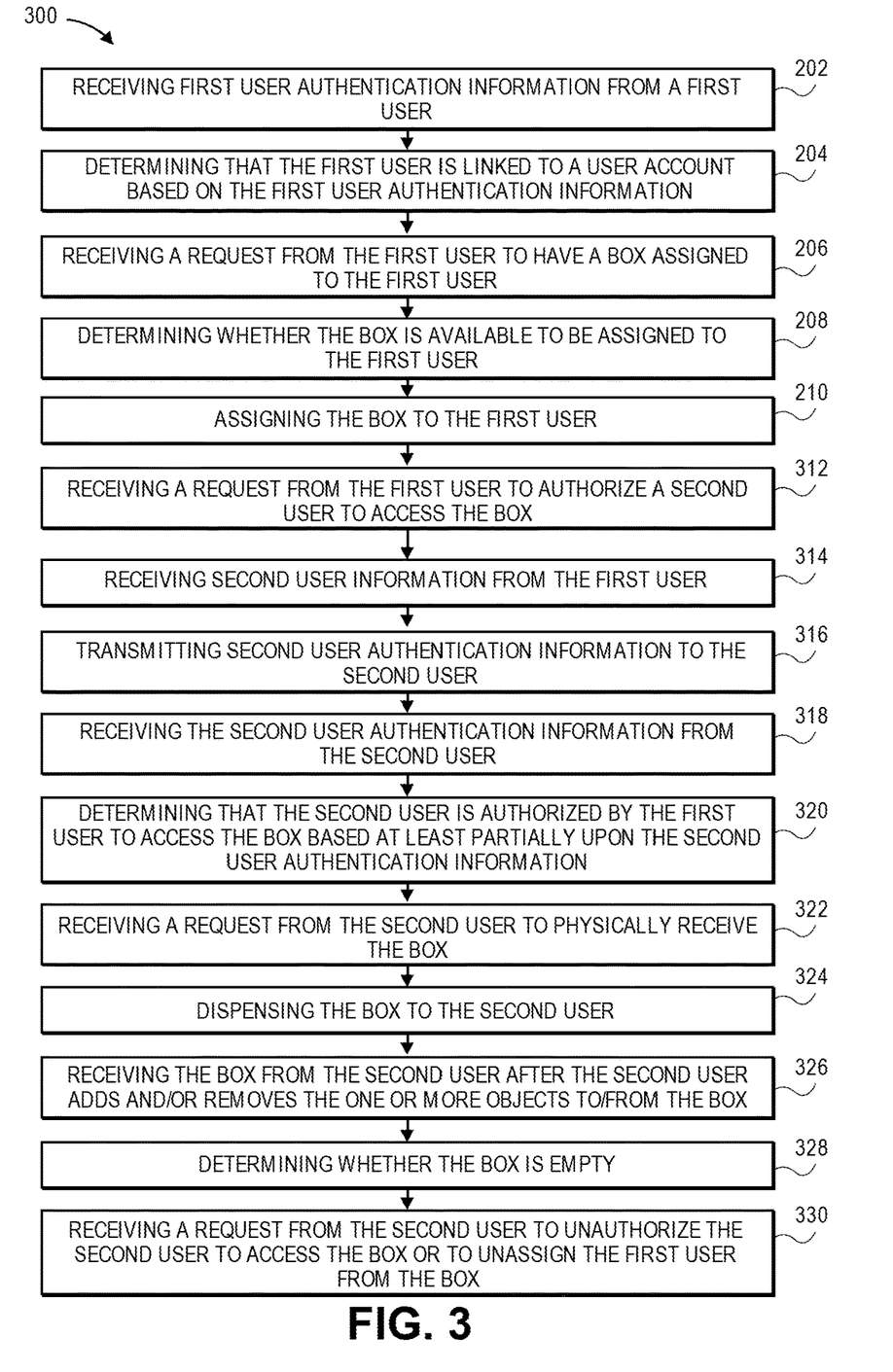
FIG. 3 is a diagram illustrating an example of a flowchart of another method for storing an object.

FIG. 3 is a diagram illustrating an example of a flowchart of another method 300 for storing an object. The method 300 may be similar to the method 200. For example, the method 300 may include steps 202, 204, 206, 208, and/or 210. However, rather than proceeding to step 212, the method 300 may instead include receiving a request from the first user to authorize a second user to access the box 120A, as at 312. In one example, the first user may be leaving town and want the second user to check on the first user's house (e.g., to water the plants, feed a pet, etc.). In this example, the first user may leave an object (e.g., a key) to the first user's house in the box 120A and authorize the second user to access or get the key from the box 120A.

After the request to authorize the second user to access the box 120A, the method 300 may also include receiving second user information, as at 314, where the second user information identifies the person that is being given access to the box 120A and/or identifies a communication channel (e.g., an email address or cell phone number) to the person that is being given access. The first user and/or the second user may submit the second user information remotely (e.g., via a user device such as a personal computer, smart phone, or tablet) or in person (e.g., manually into the system 100 using the card reader 130 and/or the keypad 140). The second user information may include the second user's name, address, phone number, email address, social security number, credit card number, debit card number, driver's license number, picture, or the like, or a combination thereof. The second user information may be stored by the system 100 and/or transmitted to the second user, as described below.

After the second user information is received, the method 300 may also include transmitting second user authentication information to the second user, as at 316. In some embodiments, step 316 may be omitted. The second user authentication information may be transmitted via text message, email, etc., or the second user authentication information may be transmitted by displaying it on the display screen 160 if the second user is present in person. The second user authentication information transmitted to the second user may include the second user information and/or include an access code (e.g., a password, QR code, PIN number, or the like). In some implementations, the second user authentication information may include an application for the second user to generate a QR code using a web/mobile interface on a device such as a smart phone. In another example, a QR code may be provided to the second user by the first user, e.g., printed on a piece of paper. In implementations that use a QR code, the system 100 or the first user may determine how long the QR code is valid. After the QR code expires, the system 100 will not provide access based on the QR code as the second user may no longer be authorized to access the box 120A.

The method 300 may also include receiving the second user authentication information from the second user, as at 318. In various implementations, the second user authentication information may be required to be submitted in person (i.e., not remotely). For example, the second user may insert a card belonging to the second user (e.g., a credit card or the like) into the card reader 130 and/or display the QR code to the camera 150 so that the system 100 can read the code and/or manually enter a name, address, password or other second user authentication information into the system 100 using the keypad 140 and/or the display screen 160. The method 300 may also include determining that the second user is authorized by the first user to access the box 120A based at least partially upon the second user authentication information, as at 320. This may include comparing the data from steps 312, 314, and/or 318 to determine if a match occurs (i.e., the second user is authorized and/or the authentication information submitted by the second user is valid and corresponds to authentication information stored in the user account). After the second user is determined to be authorized, the method 300 may also include receiving a request from the second user to physically receive or access the box 120A, as at 322.

In response to the request, the method 300 may also include automatically dispensing the box 120A (from the system 100) to the second user, as at 324. The box 120A may be dispensed as described above with respect to FIG. 2. After the box 120A is dispensed to the second user, the second user may open the box 120A and add one or more objects to the box 120A and/or remove one or more objects from the box 120A. The objects may belong to the first user and/or to the second user (i.e., not to the system 100). The method 300 may also include receiving the box 120A from the second user after the second user adds and/or removes the one or more objects to/from the internal volume of the box 120A, as at 326. The box 120A may be received as described above with respect to FIG. 2.

In at least one embodiment, after the box 120A is received, the method 300 may include determining whether the box 120A is empty, as at 328. This may include weighing the box 120A and comparing the weight to the known weight of an empty box. If the box 120A is determined to be empty, the first user and/or second user may be asked if he/she wants to continue renting the box 120A or to stop renting the box 120A. Thus, if the box 120A is determined to be empty, the method 300 may also include receiving a request from the first user and/or the second user to unauthorize the second user to access the box or to unassign the first user from the box 120A, as at 330.

Figure 4:
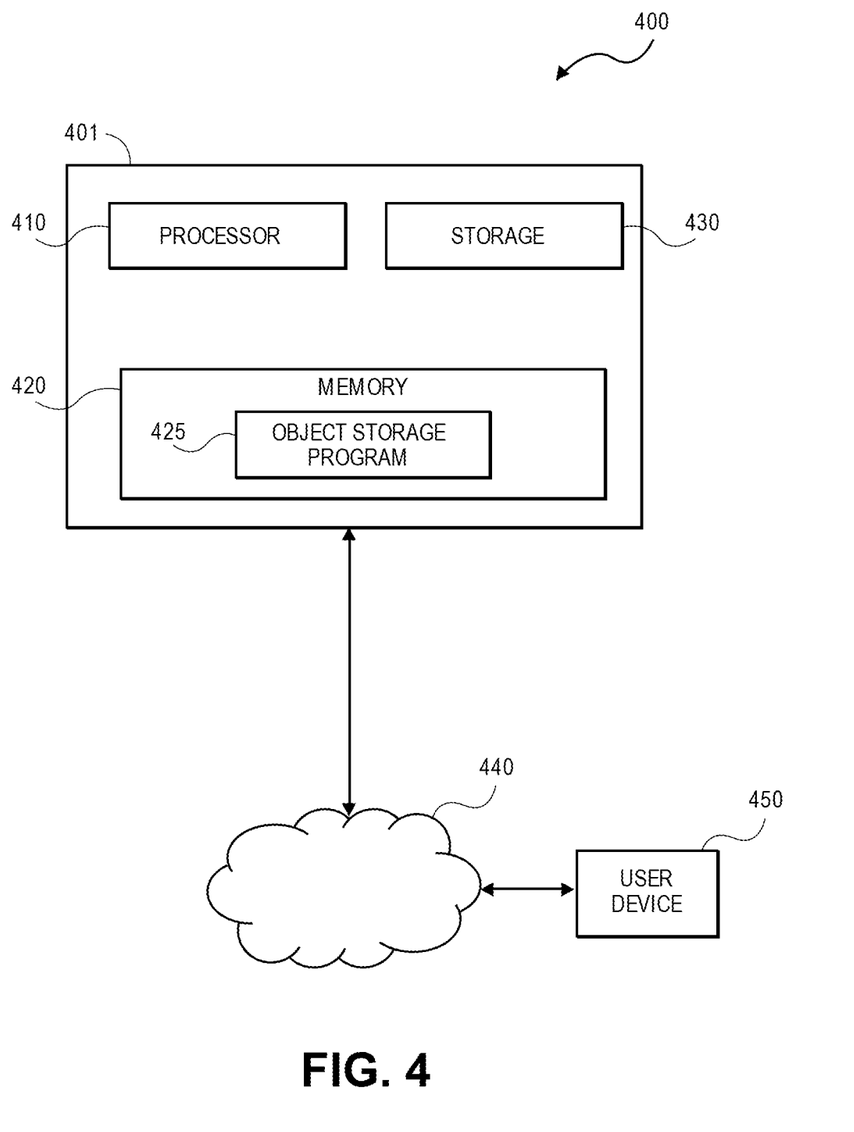
FIG. 4 is a diagram illustrating an example of a hardware system for performing at least a portion of the method(s) disclosed herein, consistent with certain disclosed embodiments.

FIG. 4 is a diagram illustrating an example of a hardware system 400 for performing at least a portion of one or more of the methods 200, 300, consistent with certain disclosed embodiments. The example of a hardware system 400 includes examples of system components that may be used. The components and arrangement, however, may be varied.

As the example of FIG. 4 shows, the hardware system 400 may include a computer 401. The computer 401 may include a processor 410, a memory 420, a storage 430, and input/output (I/O) devices (not pictured). The computer 401 may be implemented in various ways and can be configured to perform any of the embodiments described above. In some embodiments, the computer 401 can be a general-purpose computer such as, for example, a desktop computer, a laptop, a tablet device, a mobile device (e.g., a smartphone), etc. In other embodiments, the computer 401 can be a more capable computing device such as, for example, a data base server, a web server, a mainframe computer, etc. The computer 401 may be standalone or may be part of a subsystem, which may, in turn, be part of a larger system. For example, the computer 401 can be in communication with or otherwise positioned within the system 100.

The processor 410 may include one or more known processing devices, such as a microprocessor from the Intel Core™ family manufactured by Intel™, the Phenom™ family manufactured by AMD™, or the like. The memory 420 may include one or more storage devices configured to store information and/or instructions used or executed by the processor 410 to perform certain functions and operations related to the disclosed embodiments. The storage 430 may include a volatile or non-volatile, magnetic, semiconductor, tape, optical, removable, non-removable, or other type of computer-readable medium used as a storage device. In some embodiments, the storage 430 can include or contain, for example, the information associated with the existing user accounts.

In an embodiment, the memory 420 may include one or more programs or subprograms including instructions that may be loaded from the storage 430 or elsewhere that, when executed by the processor 410 of the computer 401, perform various procedures, operations, stages, or processes consistent with disclosed embodiments. For example, the memory 420 may include an object storage program 425 for performing at least a portion of the methods 200, 300. The memory 420 may also include other programs that perform other functions, operations, and processes, such as programs that provide communication support, Internet access, etc. The object storage program 425 may be embodied as a single program, or alternatively, may include multiple subprograms that, when executed, operate together to perform the function of the object storage program 425 according to disclosed embodiments.

The computer 401 may communicate over a link with a network 440 to, for example, a remote user device (e.g., a computer, a smart phone, a tablet, etc.) 450. For example, the link may be a direct communication link, a local area network (LAN), a wide area network (WAN), or other suitable connection. The network 440 may include the internet, as well as other networks, which may be connected to various systems and devices.

The computer 401 may include one or more input/output (I/O) devices (not pictured) that allow data (information) to be received and/or transmitted by the computer 401. The I/O devices may also include one or more digital and/or analog communication I/O devices that allow the computer 401 to communicate with other machines and devices. The I/O devices may also include input devices such as a keyboard or a mouse, and may include output devices such as a display or a printer. The computer 401 may receive data (e.g., user name, account number, password, QR code, etc.) and then output data (e.g., on the display screen 160). The configuration and number of input and/or output devices incorporated in I/O devices may vary as appropriate for various embodiments. Example uses of the hardware system 400 can be described by way of example with reference to the embodiments described above.

While the teachings have been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A system for storing an object, the system comprising:
a card reader configured to receive a card from a user, wherein the system is configured to determine an identity of the user based on information on the card; and
a secure storage area in a body of the system configured to store a plurality of physical boxes, wherein the plurality of physical boxes comprises a first physical box that is assigned to the user;
wherein the first physical box is configured to be automatically dispensed from the secure storage area to the user outside of the secure storage area in response to the user requesting to physically receive the first physical box,
wherein dispensing the first physical box comprises moving the first physical box along a predetermined path in the secure storage area and presenting the first physical box for removal from the secure storage area,
wherein the first physical box defines an internal volume that is configured to store one or more physical objects, and
wherein the first physical box is configured to be returned to the secure storage area after the user adds the one or more physical objects to, or removes the one or more physical objects from, the internal volume of the first physical box.

2. The system of claim 1, wherein the system comprises an automated teller machine.

3. The system of claim 1, further comprising a belt positioned within the secure storage area,
wherein the first physical box is attached to the belt when the first physical box moves along the predetermined path in the secure storage area, and wherein the first physical box is detached from the belt when the first physical box is removed from the secure storage area.

4. The system of claim 1, wherein the system is configured to assign the first physical box to the user when the user is remote from the system, prior to the user submitting the card to the card reader.

5. The system of claim 1, wherein the system is configured to determine whether the first physical box is empty by weighing the first physical box after the user returns the first physical box.

6. A method for storing an object, the method comprising:
providing a map to a user showing a plurality of secure storage areas at a plurality of geographic locations, wherein the map indicates which of the secure storage areas have available physical boxes;
receiving a request from the user to have a physical box assigned to the user, wherein the physical box is one of the available physical boxes at one of the secure storage areas;
assigning the physical box to the user in response to the request to have the physical box assigned to the user;
receiving a request from the user to physically receive the physical box;
automatically dispensing the physical box to the user outside of the secure storage area in response to the request to physically receive the physical box, wherein dispensing the physical box comprises moving the physical box along a predetermined path in the secure storage area and presenting the physical box for removal from the secure storage area, and wherein the physical box defines an internal volume that is configured to store one or more physical objects; and
receiving the physical box from the user after the user adds the one or more physical objects to, or removes the one or more physical objects from, the internal volume of the physical box,
wherein the physical box is received into the secure storage area.

7. The method of claim 6, further comprising receiving authentication information from the user, wherein the authentication information and the request to have the physical box assigned to the user are submitted in person by the user to an automated teller machine, and wherein the automated teller machine automatically dispenses the physical box.

8. The method of claim 6, further comprising receiving authentication information from the user, wherein the authentication information and the request to have the physical box assigned to the user are submitted remotely by the user.

9. The method of claim 8, wherein the request to physically receive the physical box is submitted in person by the user to an automated teller machine.

10. The method of claim 9, further comprising receiving the authentication information a second time from the user in person after the physical box is assigned to the user and prior to receiving the request to physically receive the physical box.

11. The method of claim 6, further comprising determining, by an automated teller machine,
whether the physical box is empty after the physical box is received from the user.

12. The method of claim 11, wherein determining whether the physical box is empty comprises weighing the physical box.

13. The method of claim 11, further comprising receiving a request from the user to unassign the physical box from the user after the physical box is determined to be empty.

14. A method for storing an object, the method comprising:
receiving a request from a first user to authorize a second user to access a physical box,
wherein the physical box is one of a plurality of physical boxes that are located in a secure storage area;
receiving a request from the second user to physically receive the physical box;
automatically dispensing the physical box to the second user in response to the request to physically receive the physical box, wherein dispensing the physical box comprises moving the physical box along a predetermined path using a belt and presenting the physical box for detachment from the belt, and wherein the box defines an internal volume that is configured to store one or more physical objects; and
receiving the physical box from the second user after the second user adds the one or more physical objects to, or removes the one or more physical objects from, the internal volume of the physical box.

15. The method of claim 14, further comprising:
receiving first user authentication information from the first user;
determining that the first user is linked to a user account based on the first user authentication information;
receiving a request from the first user to have the physical box assigned to the first user; and
assigning the physical box to the first user in response to the request to have the physical box assigned to the first user, wherein the physical box is assigned to the first user prior to receiving the request to authorize the second user to access the physical box.

16. The method of claim 14, further comprising:
receiving second user information from the first user after receiving the request to authorize the second user to access the physical box;
transmitting second user authentication information to the second user after the second user is authorized to access the physical box;
receiving the second user authentication information from the second user; and
determining that the second user is authorized to access the physical box based on the second user authentication information prior to receiving the request from the second user to physically receive the physical box.

17. The method of claim 16, wherein the second user information comprises one or more of:
a name, an address, a phone number, an email address, a picture, or a combination thereof, and
wherein the second user authentication information comprises a password.

18. The method of claim 17, further comprising:
determining whether a predetermined period of time for the password to be valid has expired; and
wherein automatically dispensing the physical box to the second user comprises dispensing the physical box to the second user only if the password is valid and the period of time has not expired.

19. The method of claim 14, further comprising:
determining whether the physical box is empty after the physical box is received from the second user; and
receiving a request to unassign the physical box from the first user after the physical box is determined to be empty.

20. The method of claim 14, further comprising receiving a request from the first user to unauthorize the second user from accessing the physical box, wherein the request from the first user to unauthorize the second user from accessing the physical box is received after the physical box is received from the second user.

* * * * *